US005244225A

United States Patent [19]

Frycek

[11] Patent Number: 5,244,225

[45] Date of Patent: Sep. 14, 1993

[54] WHEEL CHAIR HANDLE EXTENSION ASSEMBLY

[76] Inventor: Charles E. Frycek, 602 N. Carroll St., Horseheads, N.Y. 14845

[21] Appl. No.: 952,319

[22] Filed: Sep. 28, 1992

[51] Int. Cl.[5] ............ B62B 11/00

[52] U.S. Cl. ............ 280/304.1; 280/304.5; 280/47.371; 280/655.1; 297/183

[58] Field of Search ............ 280/47.371, 655.1, 655, 280/657, 658, 769, 304.1, 304.5; 297/DIG. 4, 183

[56] References Cited

U.S. PATENT DOCUMENTS 3,796,439 3/1974 Perego ............ 280/655.1
3,944,241 3/1976 Epelbaum ............ 280/47.371
4,989,890 2/1991 Lockard et al. ............ 280/304.1
5,044,650 9/1991 Eberle, Jr. ............ 280/304.1

*Primary Examiner*—Richard M. Camby
*Attorney, Agent, or Firm*—Leon Gilden

[57] ABSTRACT

A wheel chair is arranged to include first and second tubular handles extending from the wheel chair, wherein the tubular handles are each arranged to receive respective handle extensions of a generally "Z" shaped configuration. The extensions are arranged for storage in a lowered orientation relative to the wheel chair assembly and pivotal to a raised orientation to permit ease of manipulation of the wheel chair relative to stairs and the like when presenting the wheel chair for manipulation along a descending or ascending orientation.

3 Claims, 4 Drawing Sheets

WHEEL CHAIR HANDLE EXTENSION ASSEMBLY

BACKGROUND OF THE INVENTION

1. Field of the Invention

The field of invention relates to wheel chair structure, and more particularly pertains to a new and improved wheel chair handle extension assembly wherein the same is arranged to enhance ease of manipulation of the wheel chair.

2. Description of the Prior Art

Wheel chairs of various types are utilized throughout the prior art and are typically of conventional construction having a seat and a back, with the seat having a seat framework mounting wheels in a parallel relationship on opposed sides of the seat. The instant invention attempts to overcome deficiencies of the prior art by providing for handle extensions arranged for mounting to the wheel chair handles to provide for ease of manipulation of the wheel chair during ascent and descent of the wheel chair relative to a staircase, ramp structure, and the like during assist by an individual.

The prior art has heretofore failed to address the ease and assistance in the manipulation of a wheel chair by utilization of such handle structure, wherein prior art handle structure is exemplified in the U.S. Pat. No. 5,044,650 to Eberle, Jr. wherein a unitary handle member is arranged for reception within wheel chair tubes.

SUMMARY OF THE INVENTION

In view of the foregoing disadvantages inherent in the known types of wheel chair apparatus now present in the prior art, the present invention provides a wheel chair handle extension assembly wherein the same is arranged for pivotally mounting to and reception within wheel chair handles. As such, the general purpose of the present invention, which will be described subsequently in greater detail, is to provide a new and improved wheel chair handle extension assembly which has all the advantages of the prior art wheel chair apparatus and none of the disadvantages.

To attain this, the present invention provides a wheel chair arranged to include first and second tubular handles extending from the wheel chair, wherein the tubular handles are each arranged to receive respective handle extensions of a generally "Z" shaped configuration. The extensions are arranged for storage in a lowered orientation relative to the wheel chair assembly and pivotal to a raised orientation to permit ease of manipulation of the wheel chair relative to stairs and the like when presenting the wheel chair for manipulation along a descending or ascending orientation.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved wheel chair handle extension assembly which has all the advantages of the prior art wheel chair apparatus and none of the disadvantages.

It is another object of the present invention to provide a new and improved wheel chair handle extension assembly which may be easily and efficiently manufactured and marketed.

It is a further object of the present invention to provide a new and improved wheel chair handle extension assembly which is of a durable and reliable construction.

An even further object of the present invention is to provide a new and improved wheel chair handle extension assembly which is susceptible of a low cost of manufacture with regard to both materials and labor, and which accordingly is then susceptible of low prices of sale to the consuming public, thereby making such wheel chair handle extension assemblies economically available to the buying public.

Still yet another object of the present invention is to provide a new and improved wheel chair handle extension assembly which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 4 is an orthographic side view of the handle extensions arranged in a raised orientation for ease of manipulation of the wheel chair relative to a stairway and the like.

DESCRIPTION OF THE PREFERRED EMBODIMENT

Figure 1:
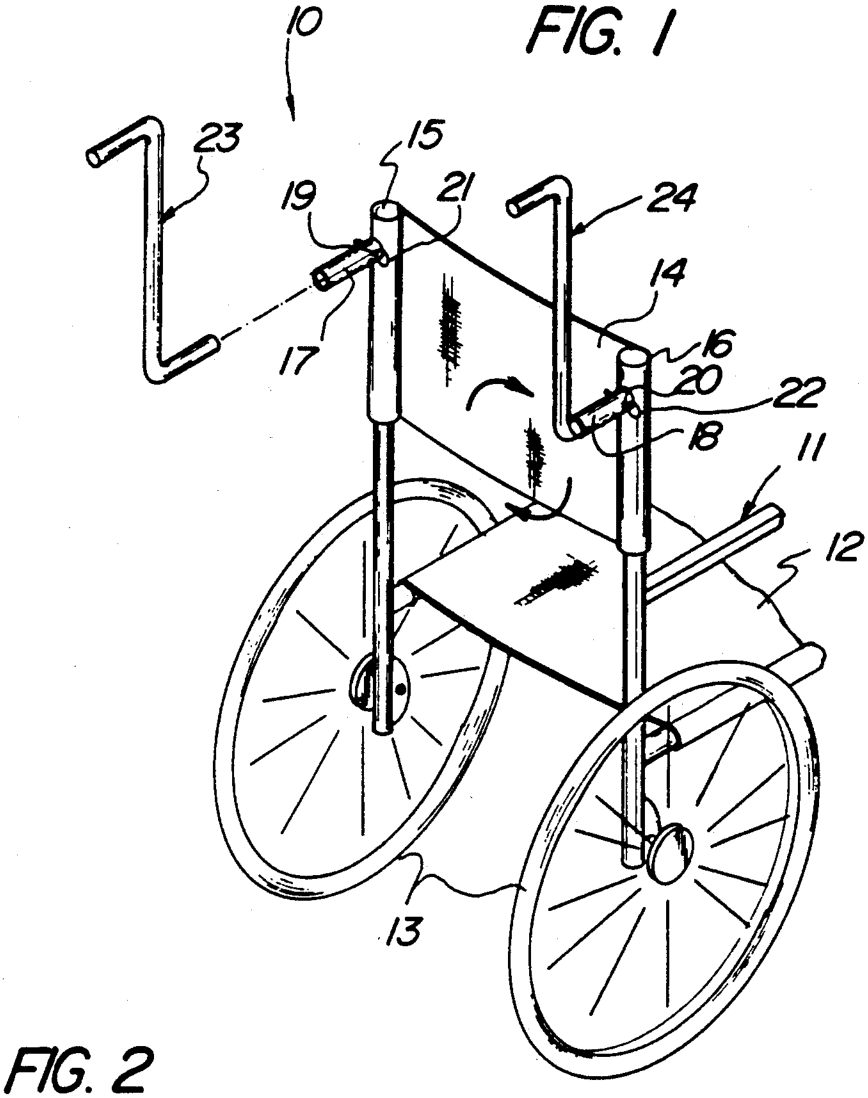
FIG. 1 is an isometric illustration of the invention.
Figure 2:
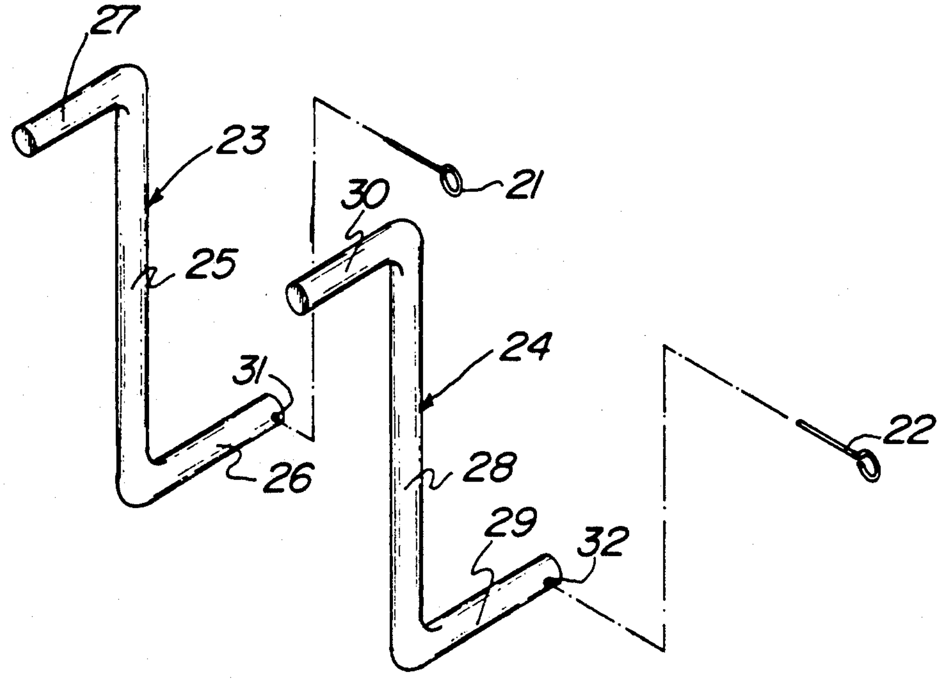
FIG. 2 is an isometric illustration of the extension handles utilized by the invention.

With reference now to the drawings, and in particular to FIGS. 1 to 8 thereof, a new and improved wheel chair handle extension assembly embodying the principles and concepts of the present invention and generally designated by the reference numeral 10 will be described.

Figure 3:
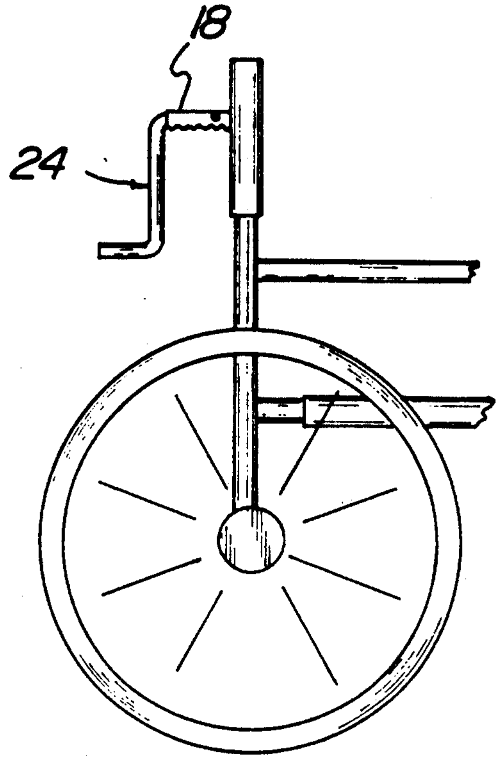
FIG. 3 is an orthographic side view of the handles oriented in a lower orientation.
Figure 4:
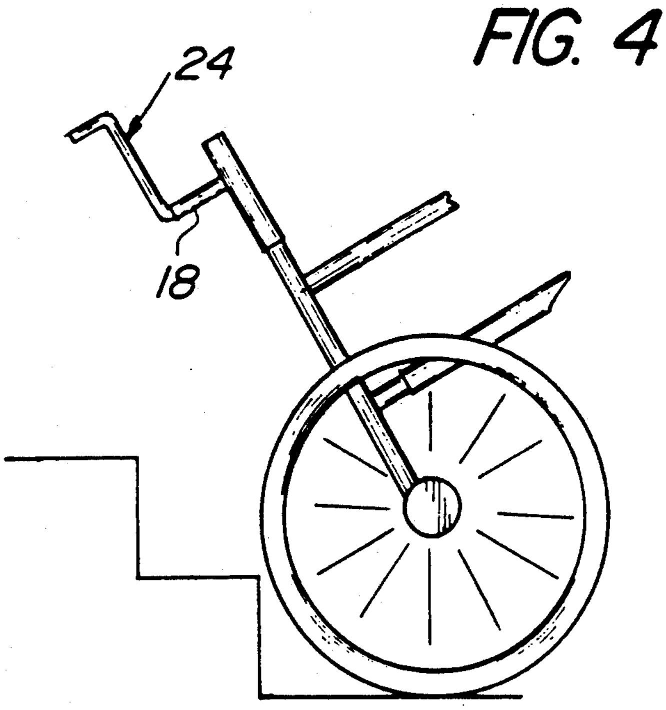

More specifically, the apparatus 10 of the instant invention essentially comprises a wheel chair 11 having a wheel chair seat and framework 12 mounting wheel members 13 rotatably to each side thereof relative to first and second frame legs 15 and 16 substantially orthogonally oriented relative to the seat framework 12. A seat back 14 extends between the first and second frame legs 15 and 16, with first and second frame leg tubular handles 17 and 18 substantially orthogonally mounted to the first and second frame legs 15 and 16 respectively projecting rearwardly of the frame legs as the seat and framework 12 projects forwardly of the frame legs. First and second handle apertures 19 and 20 are directed through the first and second tubular handles 17 and 18 in adjacency to the respective first and second frame legs 15 and 16, with the first and second handle apertures 19 and 20 receiving a respective first and second lock pin 21 and 22 therethrough arranged to fixedly secure the first and second handle extensions 23 and 24. The first and second handle extensions 23 and 24 include respective first and second handle legs 29 and 30, with the first and second handle legs 29 and 30 having respective first and second handle leg bores 31 and 32 that are coaxially aligned with the first and second handle apertures 19 and 20 to permit projection of the associated first and second lock pins 21 and 22 simultaneously through the first and second tubular handles 17 and 18 and the first and second handle legs 27 and 30. In this manner, the first and second handle extensions 23 and 24 may be oriented to project above the first and second tubular handles 17 and 18, in a manner as indicated in FIGS. 1 and 4 for example, or to project below the first and second tubular handles, in a manner as indicated in FIG. 3, during periods of non-use.

The first and second handle extensions 23 and 24 include respective first and second central legs 25 and 28, with the first central leg 25 having a first extension leg 26 orthogonally mounted to a first end of the central leg 25, with the first handle leg 27 orthogonally mounted to a second end of the first central leg 25, with the first extension leg and the first handle leg oriented parallel relative to one another and projecting in opposed orientations relative to one another on opposed sides of the first central leg 25. Similarly, the second central leg 28 includes a second extension leg 29 fixedly and orthogonally mounted to the second central leg first end, with the second central leg having a second central leg second end orthogonally and integrally mounting the second handle leg 30 in an opposed orientation to the second extension leg 29 on opposite sides of the second central leg 28.

Figure 5:
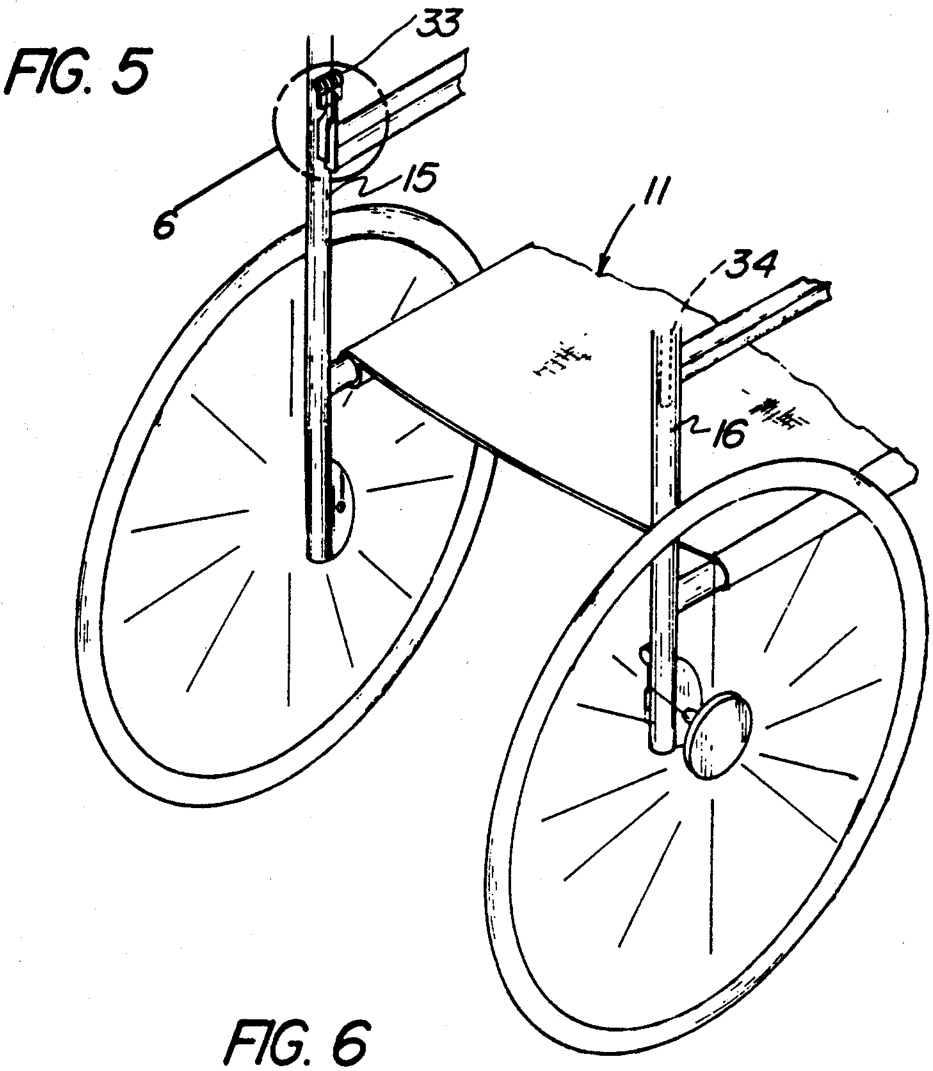
FIG. 5 is an isometric enlarged illustration of the use of handle extension clamp structure optionally employed by the invention.
Figure 6:
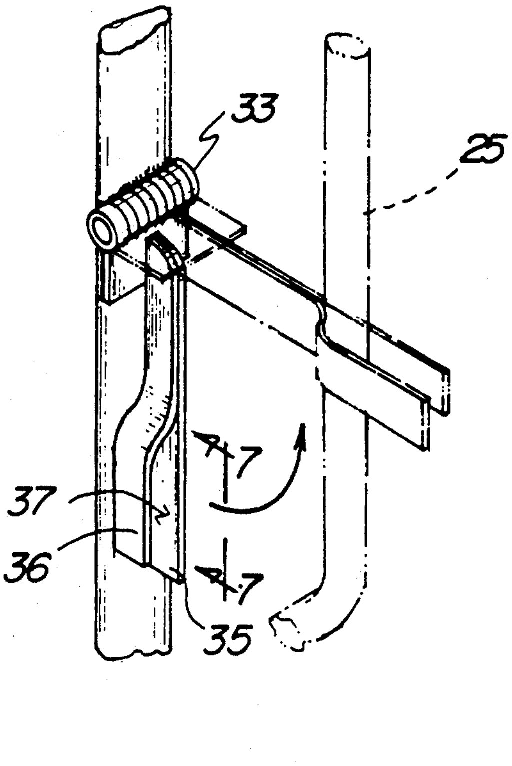
FIG. 6 is an enlarged isometric illustration of section 6 as set forth in FIG. 5.
Figure 7:
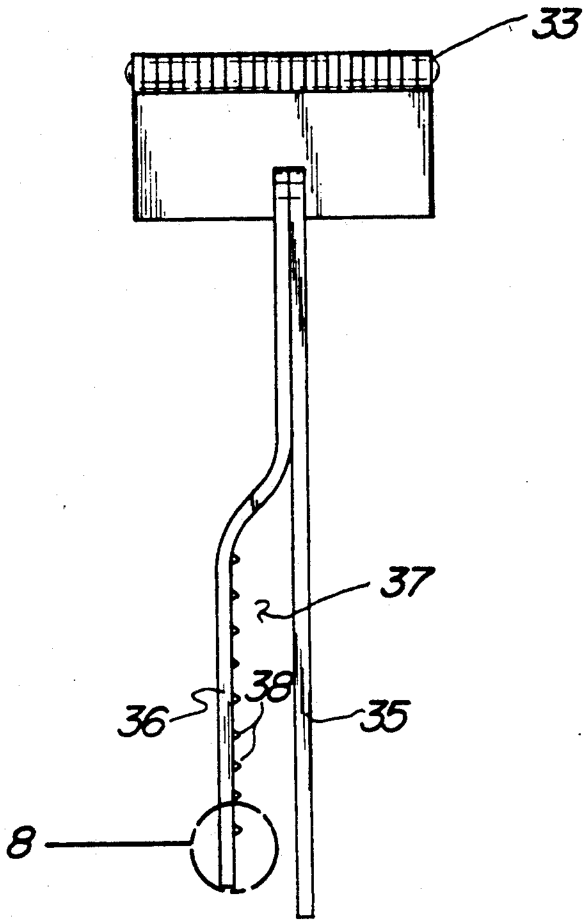
FIG. 7 is an orthographic view, taken along the lines 7—7 of FIG. 6 in the direction indicated by the arrows.
Figure 8:
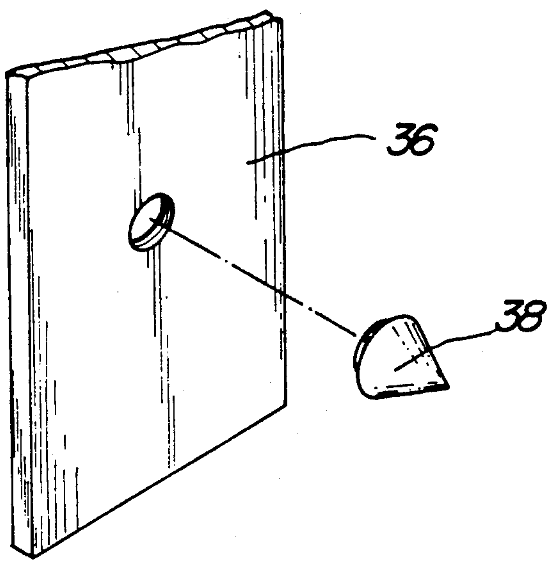
FIG. 8 is an enlarged isometric illustration of section 8 as set forth in FIG. 7.

The FIGS. 5–7 indicate the use of optionally employed latch members having a first and second hinge 33 and 34 mounted in confronting relationship relative to one another to the respective first and second frame legs 15 and 16 of the wheel chair 11. The first and second hinges 33 and 34 include a first lock flange 35, with a second lock flange 36 arranged in spring biased and confronting relationship relative to the first lock flange 35 defining a gap 37 therebetween to permit storage of the first and second central legs. It should be noted that the first and second hinges 33 and 34 may be positioned as desired angularly relative to the respective first and second frame legs 15 and 16 to receive the first and second central legs respectively dependent upon the extent of projection of the first and second central legs upon their downward pivotment in the second position as indicated in FIG. 3, from the first position as indicated in FIG. 4.

To assist in securement of the first and second central legs 25 and 26 within a respective gap 37 of the first and second lock members, a row of resilient plug members 38 are mounted to the second lock flange 36 in confronting relationship relative to the first lock flange 35 within the gap 37. In this manner, the resilient plug members 38 assist in maintaining the central legs therewithin, even should the extension legs be removed relative to the respective first and second tubular handles 17 and 18 for storage of the extension legs relative to the associated wheel chair 11.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A wheel chair handle extension assembly in combination with a wheel chair, wherein the wheel chair includes a seat and seat framework, with wheel members mounted rotatably and projecting exteriorly of the seat and seat framework, with a seat back, and a first frame leg and a second frame leg oriented obliquely relative to the seat framework, wherein the first frame leg and the second frame leg are arranged in a parallel coextensive relationship, with the seat back extending between the first frame leg and the second frame leg, and the first frame leg having a first tubular handle, the second frame leg having a second tubular handle, the first tubular handle and second tubular handle are arranged in a parallel coextensive relationship, and a first generally "Z" shaped handle extension pivotally mounted within the first tubular handle and a second "Z" shaped handle extension mounted rotatably within the second tubular handle, and first lock means mounting the first handle extension to the first tubular handle, and second lock means mounting the second handle extension to the second tubular handle, and the first lock means includes a first handle aperture directed through the first tubular handle, and the second lock means includes a second handle aperture directed through the second tubular handle, and the first handle extension includes a first central leg, with the first central leg having a first central leg first end and a first central leg second end, the first central leg first end having a first extension leg fixedly mounted thereto orthogonally oriented relative to the first central leg, and the first central leg second end having a first handle leg orthogonally mounted to the first central leg second end in a fixed relationship, wherein the first extension leg and the first handle leg are parallel relative to one another projecting on opposed orientations relative to the first central leg, and the first lock means further includes a first handle leg bore directed through the first extension leg, and a first lock pin slidably directed through the first leg bore and the first handle aperture, and the second handle extension having a second central leg and a second central leg first end and a second central leg second end, the second central leg first end having a second extension leg fixedly and orthogonally mounted thereto, the second central leg second end having a second handle leg fixedly mounted thereto in an orthogonal relationship, wherein the second extension leg and the second handle leg are each in a parallel relationship directed in opposed orientations relative to the second central leg, with the second lock means including a second handle leg bore directed through the second handle leg, and a second lock pin directed through the second handle leg bore and the second handle aperture, and the first handle extension and the second handle extension are arranged to project above the respective first tubular handle in a first position, and wherein the first handle extension and the second handle extension project below the respective first tubular handle and the second tubular handle in a second position.

2. A wheel chair handle extension assembly as set forth in claim 1 wherein the first frame leg and the second frame leg each include a respective first lock member and second lock member, wherein the first lock member and the second lock member are arranged to secure the first handle extension and the second handle extension respectively in the second position.

3. A wheel chair handle extension assembly as set forth in claim 2 wherein each lock member of said first lock member and second lock member includes a hinge member, wherein the first lock member includes a first hinge member mounted to the first frame leg, and the second lock member includes a second hinge member mounted to the second frame leg, each hinge member includes a first lock flange and a second lock flange spaced from the first lock flange to define a gap therebetween, wherein the first lock flange and the second lock flange are spring biased towards one another, and the second lock flange includes a row of resilient plug members in confronting relationship relative to the first lock flange within the gap.

* * * * *